(12) United States Patent
Harwood et al.

(10) Patent No.: US 6,602,960 B1
(45) Date of Patent: Aug. 5, 2003

(54) POLYMERS AND COPOLYMERS PREPARED OR MODIFIED BY USING COBALT COMPLEXES

(75) Inventors: H. James Harwood, Stow, OH (US); Anne K. Shim, Midland, MI (US)

(73) Assignee: The University of Akron, Akron, OH (US)

(*) Notice: Subject to any disclaimer, the term of this patent is extended or adjusted under 35 U.S.C. 154(b) by 0 days.

(21) Appl. No.: 09/914,345

(22) PCT Filed: Feb. 25, 2000

(86) PCT No.: PCT/US00/04904

§ 371 (c)(1),
(2), (4) Date: Mar. 22, 2002

(87) PCT Pub. No.: WO00/50467

PCT Pub. Date: Aug. 31, 2000

Related U.S. Application Data

(60) Provisional application No. 60/121,895, filed on Feb. 26, 1999.

(51) Int. Cl.$^7$ .............................. C08F 4/00; C08F 2/38; C08F 293/00
(52) U.S. Cl. ................... 525/292; 525/332.3; 525/269; 526/171; 526/93; 526/335
(58) Field of Search .................... 525/292, 332.3, 525/269; 526/171, 93, 335

(56) References Cited

U.S. PATENT DOCUMENTS

| | | | |
|---|---|---|---|
| 4,680,352 A | 7/1987 | Janowicz et al. | 526/147 |
| 4,694,054 A | 9/1987 | Janowicz | 526/93 |
| 4,886,861 A | 12/1989 | Janowicz | 526/145 |
| 5,028,677 A | 7/1991 | Janowicz | 526/329 |
| 5,231,143 A * | 7/1993 | Abraham | 525/326.2 |
| 5,468,785 A | 11/1995 | Greuel et al. | 522/63 |
| 5,587,431 A | 12/1996 | Gridnev et al. | 525/269 |
| 5,726,263 A | 3/1998 | Gridnev | 526/147 |
| 5,756,605 A | 5/1998 | Moad et al. | 526/93 |
| 5,770,665 A | 6/1998 | Haddleton et al. | 526/131 |
| 5,847,060 A | 12/1998 | Gridnev et al. | 526/172 |

OTHER PUBLICATIONS

"Catalyzed Chain Transfer to Monomer in Free Radical Polymerization" by Enikolopyan, et al., *J. Polym. Sci.,* vol. 19, pp. 879–889 (1981).
"Determination of the Dependence of the Chain Transfer Constant on the Degree of Polymerization by Analysis of Molecular Weight Distributions" by Smirnov, *Polym. Sci. U.S.S.R.,* vol. 23, pp. 1169 (1981).
"Copolymerization of ω–Unsaturated Oligo(Methyl Methacrylate): New Macromonomers" by Cacioli, *J. Macromol. Sci.,* vol. A23(7), pp. 839–852 (1986).
"Living Radical Polymerization of Acrylates by Organocobalt Porphyrin Complexes," by Wayland, *J. Am. Chem. Soc.,* vol. 116, pp. 7943–7944 (1994).
"The Effect of Solvent on the Course of Acrylate Polymerizations Mediated by Cobaloxime and the Development of Novel Initiating Systems and No el Multi–Functional Macromonomers" by Shim et al. (1999).
"Photochemical Polymerizations Initiated and Mediated by Soluble Organocobalt Compounds," by Arvanitopoulos et al., American Chemical Society, pp. 316–331 (1998).
"The 25$^{th}$ Anniversary of Catalytic Chain Transfer" by Gridnev, *Polymer Science: Part A: Polymer Chemistry,* vol. 38, 1753–1766 (2000).
"Advances in Catalytic Chain Transfer Polymerization Mediated by Cobaloximes" by Bon et al., *Macromol. Symp.* 2001, 165, 29–42.
"Control of Radical Polymerizations by Metalloradicals" by Wayland et al., *American Chemical Society,* pp. 305–315 (1998).

* cited by examiner

*Primary Examiner*—James J. Seidleck
*Assistant Examiner*—Olga Asinovsky
(74) *Attorney, Agent, or Firm*—Renner, Kenner, Greive, Bobak, Taylor & Weber

(57) ABSTRACT

A polymerization process comprising the steps of admixing a halogen-containing compound, monomer, and a cobalt complex.

21 Claims, No Drawings

POLYMERS AND COPOLYMERS PREPARED OR MODIFIED BY USING COBALT COMPLEXES

This application claims the benefits of provisional application No. 60/121,895 filed Feb. 26, 1999.

TECHNICAL FIELD

The present invention is generally directed toward a polymerization process and the polymeric products resulting therefrom. More particularly, the polymerization process of this invention employs a cobalt complex and a halogen-containing compound to carry out the polymerization process. Advantageously, the process of the present invention provides block and graft copolymers, allows for the functionalization of halogenated polymers, and also provides a process whereby halogenated polymers can be crosslinked.

BACKGROUND OF THE INVENTION

Cobalt complexes, such as cobaloximes, have been used as chain transfer agents in free radical polymerizations. It is believed that the chain transfer process proceeds with the abstraction of a hydrogen atom from polymeric radicals and transfer to a new monomer to initiate a new polymer chain. As a result, cobalt complexes have been used to control the molecular weight of polymers synthesized from methacrylate esters and styrene.

This catalytic chain transfer, however, has only been observed in the case of methacrylic monomers and styrene. The polymerization of acrylate esters, vinyl esters monomers, and acrylonitrile monomers in the presence of cobalt complexes results in inhibition. Studies have shown that the cobalt forms a relatively stable bond with the polymer chain. By introducing electromagnetic energy, however, researchers have found that the cobalt-carbon bond that is formed between a polymer chain and the cobalt complex is photolabile. Therefore, the introduction of electromagnetic energy to these polymerization systems has led to the discovery that the polymerization of acrylates will proceed according to pseudo-living polymerization mechanisms. Moreover, certain organo-cobaloxime compounds have been photo-initiated in the presence of monomer to form block and graft copolymers.

SUMMARY OF THE INVENTION

Extensive research of the mechanisms involved in both the catalytic chain transfer and pseudo-living polymerization reactions that employ cobalt complexes has led to the discovery that cobalt complexes, such as cobaloximes, will abstract a halogen atom from a halogenated polymer and thereby form a free radical on a polymer. This research has also led to the unexpected discovery that the polymerization of acrylate esters will proceed in the presence of thermal energy in lieu of electromagnetic energy where cobalt complexes in the presence of halogen-containing compounds are used as initiators. Advantageously, these discoveries have led to the formation of grafted polymers from halogenated precursors. These discoveries have also led to the formation of block copolymers that employ thermal energy in lieu of electromagnetic energy in the polymerization process. Still further, these discoveries have provided new methods by which halogenated and unsaturated polymers can be crosslinked.

In general, the present invention provides a polymerization process comprising the steps of admixing a halogen-containing compound, monomer, and a cobalt complex.

The present invention also includes a process for forming a methacrylate-functionalized polymer comprising the steps of admixing a halogen-containing polymer, a cobalt complex, and a methacrylate ester, and heating the admixture.

The present invention further provides a process for forming polyacrylate-functionalized polymer comprising the steps of admixing a halogen-containing polymer, a cobalt complex, and acrylate monomer, and heating the admixture.

The invention also includes a process for forming a copolymer comprising the step of admixing a polymer with at least two halogen substituents, a cobalt complex, and monomer.

The present invention further includes a process for crosslinking an unsaturated polymer.

The present invention also provides a process for crosslinking a halogenated polymer comprising the step of admixing a halogenated polymer and a cobalt complex.

PREFERRED EMBODIMENT FOR CARRYING OUT THE INVENTION

The present invention generally provides a process whereby a cobalt complex and a halogen-containing compound can be used to initiate the polymerization of monomers. As a result, block or graft copolymers can be formed, halogenated polymers can be functionalized, and halogenated or unsaturated polymers can be crosslinked.

The term cobalt complex refers to cobaloximes and organocobaloximes as well as cobalt porphyrins and mixtures thereof. These cobalt complexes may be referred to as cobalt (II) and cobalt (III) chelates, and are described in U.S. Pat. Nos. 5,847,060, 5,770,665, 5,756,605, 5,726,263, 5,028,677, 4,886,861, 4,694,054, and 4,680,352, which are incorporated herein for this purpose. Additionally, these compounds can be referred to as macrocyclic cobalt complexes as described in U.S. Pat. No. 5,468,785. Cobaloximes and organocobaloximes are preferred because they can be easily prepared.

Cobaloximes include a central cobalt atom that is surrounded by two dimethylglyoxime moieties in its equatorial plane. The cobalt atom contains an unpaired electron that causes the compound to be paramagnetic and to have chemical properties similar to a stable free radical. The central cobalt atom is in the +2 oxidation state. A Lewis base is coordinated to the cobalt atom below the plane in which the two dimethylglyoxime moieties reside.

The coordinating Lewis base ligand below the equatorial plane can include any Lewis base that does not destroy the essentially planar configuration of the equatorial ligands. Non-limiting examples of these Lewis bases include pyridine and triphenylphosphine.

Organocobaloximes are similar compounds except that they include an additional organic group above the equatorial plane. The central cobalt atom, therefore, is in the +3 oxidation state, and they are diamagnetic materials that do not have the chemical characteristics of free radicals. Organocobaloximes may also be referred to as organobis (dimethylglyoximato)cobalt complexes. The organic group that may be coordinated above the equatorial plane (in the case of an organocobaloxime) can include any non-tertiary organic group that likewise does not destroy the essentially planar configuration of the equatorial ligands. Accordingly, besides this proviso, the selection of any specific organic group for coordination above the equatorial plane should not limit the scope and practice of the present invention. Non-limiting examples of these organic groups can include alkyl groups that include from 1 to about 30 carbon atoms, α-carbethoxyethyl, isopropyl, 2-hydroxy-1-butyl, ω-chloroalkyl, and ω-hydroxyalkyl. Preferred organic groups are those that would be attached by secondary carbon atoms to cobalt in the organocobaloxime. Typical examples include isopropyl, α-carbethoxyethyl, and 2-butyl. Many of the cobaloximes and organocobaloximes that are useful in practicing the present invention have been described in U.S. Pat. No. 5,468,785, which is fully incorporated herein by reference. In addition to cobaloximes and organocobaloximes, the cobalt complexes that can be used in practicing the present invention also include those that have been defined in U.S. Pat. No. 4,886,861, which is fully incorporated herein by reference.

Cobalt porphyrins include cobalt complexes of hematoporphyrin IX terramethyl ether, the cobalt complex of ethylporphyrin-1, cobalt tetraphenyl porphyrin, cobalt protoporphyrin dimethylether, and cobalt phthalocyanine. These compounds have been described as catalysts for chain transfer reactions in methacrylate ester polymerizations by Enikolopyan, et al., *J. Polym. Sci.*, Vol. 19, pp. 878–889 (1981), Smirnov, *Polym. Sci. U.S.S.R.*, Vol. 23, pp. 1169 (1981), and Cacioli *J. Macromol. Sci.*, Vol. 1723, pp. 839–852 (1986). An example of a cobalt porphyrin that is a catalyst for pseudo-living polymerization of acrylate esters is neopentyl(tetramesitylporphyrinato) cobalt as discussed by Wayland, *J. Am. Chem. Soc.*, Vol. 116, pp. 7943–7944.

Organocobaloximes are preferred because cobaloximes are very reactive compounds that readily react with oxygen and may therefore be inconvenient to directly use. Although organocobaloximes are much easier to store and handle, they must be converted to useful cobaloxime. This can be achieved by heating or by irradiating the mixture with light. Thus, the preferred reactions of the present invention involve the formation of a cobaloxime "in situ" by thermally or photochemically induced disassociation of an organocobaloxime.

The bond strengths of the carbon-cobalt bonds in compounds such as organocobaloximes are approximately 20 kcal/mole, which is generally very low. They therefore are easily induced to dissociate by exposure to temperatures as low as 70° C. or by photolysis to form the cobaloxime needed for the radical-forming reactions. This dissociation is illustrated below:

$$R^1[Co] \rightleftharpoons R^1\cdot + [Co]$$

where $R^1$ represents an organic group, and $[Co]$ represents a cobalt complex such that $R^1[Co]$ is an organo-cobalt complex. As mentioned above, cobaloximes have the chemical characteristics of free-radicals, and $[Co]$ therefore represents a radical.

Cobalt complexes are generally soluble but could be immobilized to an insoluble substrate such as crosslinked polystyrene, alumina, or silica. This would have the advantage, particularly for the catalytic chain transfer reactions, of immobilizing the cobalt complex so that it could be easily separated from the reaction mixture. Attachment of the cobalt complex to an insoluble substrate could occur if the axial base were a substituted pyridine or phosphine that was chemically bonded to the substrate. Alternatively, it could occur if the equatorial ligand were bonded to the substrate. This invention therefore includes both soluble and immobilized organocobalt complexes.

The halogen-containing compounds can be any compound or polymer containing one or more reactive carbon-halogen bonds. Those with carbon-chlorine or carbon-bromine bonds are preferred, and compounds or polymers with carbon-bromine bonds are most preferred. Compounds or polymers with several chlorine or bromine atoms attached to the same carbon atom are more reactive than those with fewer carbon-halogen bonds. Accordingly, those compounds or polymers containing more than one halogen atom are preferred.

If the carbon atom that is attached to the halogen atom is likewise attached to a group that can stabilize the free radical that eventually forms, then the free radical generation process is facilitated. Typical radical stabilization groups include, for example and without limitation, phenyl groups, carbonyl groups including those present in esters, ketones, aldehydes and anhydrides, nitrile groups, vinyl groups, and substituted vinyl groups.

Non-limiting examples of reactive halogen compounds include $CCl_4$, $CBr_4$, $CBrCl_3$, $CCl_3COOR$ (where R is an alkyl group, substituted alkyl group, aryl, substituted aryl, etc. group), $\Phi CH_2Br$, $\Phi CH_2Cl$, $CCl_3CH_3$, $\Phi CHCl_2$ and $CCl_3COCCl_3$. In general, compounds with aromatic carbon-halogen bonds will not be effective in the present processes unless they also contain aliphatic carbon-halogen bonds.

Halogenated polymers are also useful. These polymers will include at least one carbon-halogen bond at their chain ends, attached pendant to their backbone, or attached to organic groups that may be pendant from their backbone. These halogen atoms can be arranged in any combination and be included in any number. The polymers can be prepared by copolymerization reactions in which at least one of the monomers contains a reactive carbon-halogen bond, by polymerization or copolymerization reactions that are initiated by initiators that contain reactive carbon-halogen bonds, or by polymerization or copolymerization reactions conducted in the presence of chain transfer agents that contain reactive carbon-halogen bonds. The polymers could also be made by polycondensation processes. In fact, any polymerization method can be employed to make the halogen-substituted polymers including, without limitation, free radical, anionic, cationic, ring opening, metathesis, and polycondensation polymerization methods. The halogen-substituted polymers can also be prepared by chemically modifying existing polymers by halogenation, acylation, esterification, and other reactions. Non-limiting examples of these polymers include styrene-butadiene copolymers containing chloromethylstyrene units, brominated isobutylene-isoprene copolymers, and unsaturated polyesters containing reactive halogen atoms. An example of a halogenated polymer that contains halogen atoms bound to a pendant group is a copolymer of styrene and chloromethylstyrene.

In general, the presence of a higher number of halogen atoms, either as grafts or at the chain ends of the polymer, will increase the reactivity of the halogen substituted polymer with the cobalt complex. Thus, as those skilled in the art will readily appreciate, the chemical and physical properties of the end product will be more or less significantly changed depending upon the amount of halogen present in the polymer. Also the desired proportion of carbon-halogen bonds present in the polymer will depend upon the chemical and physical properties desired for a particular application.

Many monomers can be polymerized by using the process of the present invention. For example, these monomers may include acrylate esters, methacrylate esters, methacrylamides, vinyl esters, vinyl aromatics, and unsaturated nitriles. Where methacrylate esters, methacrylamides, and vinyl aromatics, such as styrene, are employed, it is believed that the polymerization carried out by the process of the present invention will proceed by a free-radical polymerization reaction that includes catalytic chain transfer. On the other hand, where acrylate esters, vinyl esters, and acrylonitriles are employed, it is believed that the polymerization of this invention will proceed by way of a pseudo-living polymerization. These mechanisms and their impact on the polymerization conditions and results are discussed in greater detail hereinbelow.

The methacrylate ester monomers that are useful in practicing the present invention can generally be defined by the formula:

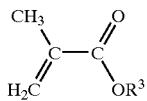

where $R^3$ includes an organic group. The organic group can include aliphatic groups, cycloaliphatic groups, aromatic groups, and polymeric groups. Preferably $R^3$ will include simple alkyl groups such as methyl, ethyl, propyl, etc. up to about 20 carbon atoms. Although these groups are carbon based, they can include hetero atoms such as oxygen, nitrogen, sulphur, silicon, and phosphorus. Preferred methacrylate ester monomers include methyl methacrylate, ethyl methacrylate, propyl methacrylate, t-butyl methacrylate, phenyl methacrylate, hydroxyethyl methacrylate, and N,N-dimethylmethacrylamide.

The acrylate monomers that are useful in the pseudo-living polymerization process of the present invention include any ester that can generally be defined by the following formula:

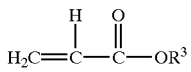

wherein $R^3$ includes an organic group as defined above. The preferred monomers include methylacrylate, ethyl acrylate, propyl acrylate, t-butyl acrylate, phenyl acrylate, or hydroxyethyl acrylate, and N,N-dimethylacrylamide.

As an optional component of the polymerization admixture, a reducing agent may be employed. As will be discussed in greater detail hereinbelow, the combination of the cobalt complex and halogenated compound form a halocobalt compound. This compound can be converted back into a useful cobalt complex by reacting it with a reducing agent. As a result, the cobalt complex can function as a catalyst.

The reducing agents that are preferably employed in practicing the present invention include those that are able to reduce the halogen-cobalt compounds back to cobalt (II) complexes such as cobaloxime. It is preferable that the reducing agents not be so reactive that they would reduce functional groups such as esters, aldehydes, or nitrile groups that may be within the monomers or polymers within the reaction mixture. Examples of these reducing agents include zinc, iron, copper, and hydrogen. The most preferred reducing agent is elemental zinc.

It should be appreciated that halogen-cobalt compounds can be employed instead of organocobalt compounds if zinc or other reducing agents are present because the reduction reaction will generate the cobalt (II) complex, e.g., cobaloxime, that is needed for radical generation and pseudo-living or catalytic chain transfer steps. This technique is very advantageous because compounds such as chlorocobaloxime are very stable, readily available, and inexpensive. In fact, it is envisioned to employ chlorocobaloximes, as well as other similar chlorine-containing compounds, to be used as curing systems for halogen-containing elastomers.

It is generally preferred to carry out the polymerization of this invention in a solvent, although some polymerization may be conducted in bulk monomer.

Typical solvents for the reaction include hexane, benzene, toluene, acetone, methyl ethyl ketone, tetrahydrofuran, methylcellusolve, dioxane, and decalin. Halogenated solvents are also useful. Mixtures of the foregoing solvents may also be employed.

The amount of cobaloxime that is useful in practicing this invention can vary depending upon the temperature and the reactivity of the carbon-halogen bonds in the halogen-containing compound and the average number of monomer units that are desired. Where halogenated polymers are employed it has been found useful to admix from about 0.05 to about 20 parts by weight catalyst per one hundred parts by weight halogenated polymer (phr). Preferably, the admixture should contain from about 1 to about 10 parts by weight catalyst phr, and even more preferably it should contain from about 2 to about 4 parts by weight catalyst phr. In the event that non-polymeric halogenated compounds are employed, the amount of cobalt complex that is useful will generally range form about 0.05 to about 2.0 moles of cobalt per mole of halogenated compound.

Where halogenated polymers are employed, the amount of methacrylate monomer that is admixed can vary depending upon the average number of methacrylate units that are desired to be present in the blocks or grafts. In general, it has been found useful to admix from about 10 to about 5,000 parts by weight methacrylate monomer phr. Preferably, the admixture should contain from about 50 to about 1,000 parts by weight methacrylate monomer phr, and even more preferably it should contain from about 100 to about 500 parts by weight methacrylate monomer phr.

Where halogenated polymers are employed, it has been found useful to admix from about 0.5 to about 100 parts by weight reducing agent phr. Preferably, the admixture should contain from about 5 to about 20 phr, and even more preferably it should contain from about 5 to about 10 phr. The amount of reducing agent that is used within the admixture can vary depending upon the amount of cobalt complex employed and the reactivity of the halocobalt compound byproduct derived from the reaction mechanism.

The process of this invention can be practiced by admixing a cobalt complex, a halogenated compound, and monomer by using standard mixing techniques. There is no specific order in which the reactants need to be admixed.

In the preferred embodiments of this invention, the reaction mixture is heated, although it should be appreciated that heat may not be required to initiate polymerization in those situations where extremely reactive halogen-containing compounds are employed. Where extremely reactive halogen-containing compounds are employed, however, the polymerization reaction is not easily controlled. In those embodiments where less reactive halogenated compounds are employed to polymerize methacrylate esters or similar monomers, the reaction mixture is preferably heated to a temperature from about 35° C. to about 150° C., more preferably from about 50° C. to about 120° C., and most preferably to about 70° C. At these elevated temperatures, catalytic chain transfer is more likely to occur. In those embodiments that employ acrylate monomers in conjunction with less reactive halogenated compounds, a controllable pseudo-living polymerization will occur, although heat is typically required. Accordingly, these polymerization are typically conducted at a temperature from about 70° C. to about 150° C. Inasmuch as it has unexpectedly been discovered that acrylate monomers, as well as similar monomers, can be polymerized according to the present invention by using heat in lieu of electromagnetic energy, the embodiments of this invention that are directed toward the polymerization of acrylate or similar monomers are preferably conducted in the absence of appreciable electromagnetic energy.

Generally, the formation of the desired reaction product is evidenced by an increase in the viscosity of the polymerization mixture. The products of polymerization, except for those intentionally crosslinked, will generally be isolated by filtrating the reaction mixture to remove unchanged reducing agents and byproducts (e.g., zinc chloride when zinc is employed), removing a portion of the monomer and solvent by vacuum distillation, and subsequently pouring the remaining solution into a non-solvent for the polymer. The precipitated polymer can then be isolated by filtration and drying. Those skilled in the art, however, can readily select other reaction and isolation techniques. This polymerization process can also occur within a reactive extruder.

It is believed that an organic radical is formed by the dissociation of the organo-cobalt complex. This radical is capable of initiating polymerization. Once an organocobaloxime dissociates, however, the organic radical and cobaloxime rapidly recombine and regenerate the original non-radical organo-cobalt complex. The recombination process is strongly exothermic and therefore the concentration of organic radicals in equilibrium with cobaloxime will be very low. Nonetheless, the rate of the dissociation reaction will be high because of the low energy bonds between the organic radicals and the cobalt atom in cobaloximes. Thus, organocobaloximes dissociate rapidly and reversibly to form organic radicals and cobaloxime, but the equilibrium strongly favors the organocobaloximes.

The equilibrium between organocobaloximes and their dissociation products is disturbed by adding halogen-containing compounds to organo-cobalt complex solutions. This causes the cobalt complex to be converted into a stable halocobaloxime that is unable to participate in the equilibrium, thereby driving the equilibrium reaction in the direction of dissociation to produce useful organic radicals.

When this reaction is conducted in the presence of monomers, a polymerization ensues. By varying the structure of the organocobaloxime or the organic halide, and by varying the concentrations of these materials or the reaction temperature, it is possible to vary the polymerization rate over a wide range.

It is believed that organic halogen compounds have an important influence on free radical polymerizations mediated by cobaloxime and organocobaloximes. The reactions of cobaloximes with organic halides form halocobaloximes and free radicals that are necessary to sustain the polymerization reaction despite the fact that conventional radical termination reactions slowly remove growing polymer chains from the system. Additionally, these reactions can advantageously be used to create growing polymer chains. For example, new growing polymer chains can be formed when an organic halide such as $CCl_4$, $CHCl_3$, $CHBr_3$ and $\Phi\text{-}CH_2Cl$ is employed. Also, growing polymer chains can be formed when the reactant $R^2[HAL]$ is a polymer containing at least one halogen atom bound either pendant to its backbone or at its chain end is employed. Block copolymers can be formed when the halogen atoms are located at the end of the polymer chains. On the other hand, if the halogen atoms are pendant to the polymer, grafted copolymers can result.

Thus, the reactions of cobalt complexes with halogen-containing compounds yield radicals that initiate polymerization reactions in a conventional way. The location of the radical on the organic halogen compound or polymer corresponds to the location of the substituted halogen atom. Thus, these polymerization reactions can lead to the formation of new polymers, block copolymers, or graft copolymers depending upon the structure of the halogen substituted compounds or polymers employed. Also, the reactions of cobalt complexes with polymers that are substituted with halogen atoms pendant to the backbone of the polymer yield polymer radicals that can either form crosslinks by reacting with other polymer radicals in the absence of monomers or initiate polymerization reactions in the presence of monomers.

It is also believed that the initiation of polymerization reactions in the presence of methacrylate monomers brings about catalytic chain transfer reactions that produce polymers bearing methacrylate-type unsaturation at their chain ends or pendant to their backbone. On the other hand, the initiation of polymerization reactions in the presence of acrylate monomers brings about pseudo-living polymerization reactions whereby block copolymers or graft polymers can be produced.

The catalytic chain transfer reactions can cause some of the methacrylate monomer to form oligomers, such as dimers or trimers, which contain unsaturated chain ends. These materials can also cause methacrylate esters to add to the growing methacrylate grafts by an addition/fragmentation process, and the oligomer radicals that are produced by this process can decompose to regenerate monomer or react with polymer radicals to form grafted or block segments that do not have unsaturated ends. Although this process likely occurs, the side reaction that leads to the formation of these oligomers does not necessarily detract from the overall process. In fact, this process can subsequently initiate the formation of unsaturated poly(methyl methacrylate) oligomers by a normal catalytic chain transfer process. Thus, the graft or block copolymer may be obtained as a mixture with these oligomers. In many applications, such as surface coating, it may be satisfactory to use the mixture as such. The oligomers, however, can also be removed by precipitation. For example, when the process involves the catalytic chain transfer process, the poly(methyl methacrylate) oligomer fraction can be recovered by an appropriate extraction process and reused to replace some of the monomer in subsequent polymerization reactions. In fact, all of the monomer can be replaced by the oligomer fraction. The methacrylate-functionalized polymer can then be separated and purified by employing conventional techniques including precipitation.

If a methacrylate ester is present, catalytic chain transfer reactions occur during the grafting process leading to the formation of short poly(methyl methacrylate) grafts having methyl methacrylate unsaturated chain end functionalities. As will be discussed below, polymers containing these grafts are extremely valuable for surface coating and casting applications.

While catalytic chain transfer reactions can be initiated by cobalt complexes in the presence of halogenated compounds or polymers and methacrylate monomers, it is believed that pseudo-living polymerizations occur when the monomers are acrylate or other vinyl monomers. In the pseudo-living polymerizations involving acrylate monomers, the same cobalt complexes. halogen-containing compounds, and polymers are employed.

This reaction mechanism is very conducive to the creation of grafted polymers and block copolymers. Advantageously, a polymer may be functionalized with a variable number of carbon-halogen bonds branching from the backbone of the polymer such that the reaction of the halogen-functionalized polymer with a cobalt complex in the presence of acrylate monomer creates a polymer with multiple acrylate grafts. This pseudo-living process for forming grafted polymers is different from the catalytic chain transfer reactions involving methacrylate monomers and allows for the production of block copolymers.

To form multi-block copolymers or block copolymer grafts, the termination of the growing acrylate chain through recombination with the cobalt complex radical is exploited. Upon termination, additional, but different, monomer may be introduced to the system before the polymer-cobalt bond is broken by thermolysis, such that, upon thermolysis, the new monomer will add to the acrylate chains until their growth is, in turn, terminated through combination with the cobalt complex radical. Then, the acrylate monomer can be reintroduced into the system to grow an acrylate block, and so on.

As discussed above, the reaction of cobalt complexes, such as cobaloximes, with organic-halogen compounds leads to the formation of stable halocobalt compound byproducts, such as halocobaloximes. Although inert, these compounds remove reactive cobalt complexes from the reaction mixture and therefore one cobalt complex molecule is required for each free radical generated. This process can be made more efficient by providing the reaction mixture with a reducing agent, such as zinc dust, that will convert the halocobalt byproduct back to a useful cobalt complex, as shown in the following reaction mechanism:

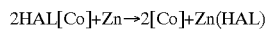

2HAL[Co]+Zn→2[Co]+Zn(HAL)

The use of the these reducing agents to increase the efficiency of radical generation is one preferred embodiment of this invention.

As discussed above, the polymerization process of this invention can give rise to a variety of useful polymeric structures that may vary based upon the reactants and polymerization conditions employed.

The methacrylate-functionalized polymers that are formed by the process of this invention are unique materials. They contain terminal methacrylate double bonds that are connected by only carbon-carbon bonds to the polymer backbone. These methacrylate-functionalized polymers are extremely useful for forming coatings and castings because they can include numerous methacrylate functional groups along the backbone of the polymer. As a result, low molecular weight materials can be produced that have a relatively low viscosity and that can be quickly cured to form high molecular weight films, coatings and castings. These functionalized polymers can advantageously include a multitude of methacrylate functionalities, which make these polymers especially useful for coating and casting applications.

Other useful polymer structures is a polyacrylate-functionalized polymers. Because the polymerization mechanism leading to the formation of these grafted polymers is believed to proceed by way of a pseudo-living polymerization, the resulting product can be synthesized to include long or high molecular weight polyacrylate grafts that are nearly gel-free.

Still other polymeric structures that can result from the practice of the present invention include block copolymers. Advantageously, these copolymers can be used as thermoplastic elastomers, dispersants, compatibilizers, thickeners, and surface active materials.

The discoveries relating to the use of cobalt complexes in conjunction with halogen-containing compounds have also led to new processes whereby halogenated polymers or unsaturated polymers can be crosslinked. In the case of halogenated polymers, the reaction between a halogenated polymer and a cobalt complex will generate a free radical on the polymer chain that can combine with similar free radicals on other polymers chains to achieve a crosslink. Where polymerizable monomer is present, the free radicals can initiate polymerization and thereby form crosslinks between polymeric chains.

In the case where it is desirable to crosslink unsaturated polymers, the combination of cobalt complexes and halogenated compounds will again form free radicals that will react with double bonds on the unsaturated polymeric chain. As a result, cobalt complexes in conjunction with halogenated compounds can serve to crosslink unsaturated polymers.

In order to demonstrate the practice of the present invention, the following examples have been prepared and tested as described in the General Experimentation section disclosed herein below. The examples should not, however, be viewed as limiting the scope of the invention. The claims will serve to define the invention.

GENERAL EXPERIMENTATION

The cobalt complexes (cobaloximes and organocobaloximes) that were employed within the experiments taught within this written description were prepared by using the techniques employed by Schrauzer et al. (*Chem. Ber.*, 1964, 97,3056 & *J. Am. Chem. Soc.*, 1967, 98, 1999).

EXAMPLE 1

Poly(chloromethylstyrene-co-styrene) was functionalized with methyl methacrylate. Specifically, (pyridinato) cobaloxime (0.05 g), methyl methacrylate (10 g), and poly(chloromethylstyrene-co-styrene) (1.0 g), were mixed and heated at about 70° C. for about three hours. The poly(chloromethylstyrene-co-styrene) contained about 20.4 mol percent chloromethylstyrene.

The product was isolated and was then analyzed by HNMR. The HNMR spectrum contained multiple methoxy and α-methyl proton resonances at about 3.5 and about 1 ppm indicating the presence of methyl methacrylate units at the graft junction. In addition, resonances at about 5.5 and about 6 ppm indicated the presence of unsaturated methyl methacrylate units. The relative areas of the various resonances present in this spectrum together with the molecular weight of this polymer indicated that the grafted copolymer had an average of 4.1 grafts per chain and an average number of methyl methacrylate units per graft of 6.5.

EXAMPLE 2

Poly(chloromethylstyrene-co-styrene) was functionalized with methyl methacrylate. Specifically, (pyridinato) cobaloxime (0.01755 g), zinc (0.47025 g), methyl ethyl ketone (1.0780 g), methyl methacrylate (0.9289 g), and poly(chloromethylstyrene-co-styrene) (0.29575 g), were mixed and heated at about 70° C. for about 46 hours. The poly(chloromethylstyrene-co-styrene) contained about 20.4 mol percent chloromethylstyrene.

The polymer product was isolated by precipitating the product in 40 ml of methanol followed by extraction with methanol overnight. Evidence revealed a product yield of about 0.1443 g.

EXAMPLE 3

Ethyl acrylate was polymerized by using mixtures of organocobaloximes and chloroform at 70° C. Specifically, mixtures containing ethyl acrylate (10 mL), a specified amount of an organocobaloxime (See Table I) and chloroform (2 mL) were prepared and divided into 10 crim-seal vials. Each vial was sealed with a Teflon™ coated butyl rubber crim-seal septum, and its contents were purged with argon. The vials were wrapped in foil and heated at 70° C. for various times. The vials were then cooled at room temperature, weighed on an analytical balance, and placed in a vacuum oven at 45° C. in 1 mm of Hg until they reached a constant weight.

The conversion was calculated by comparing the initial weight of a sample with the weight of the dried sample. The weight of the organocobaloxime was ignored because it never was more than 0.25 mol percent of the reaction mixture.

Samples for molecular weight determination were dissolved in THF and the solutions were filtered. Molecular weights were determined by using gel permeation chromatography with polystyrene standards. The results that were obtained are summarized in Table I. The following abbreviations were used for the cobaloxime compounds: IpPyCo refers to isopropyl(pyridinato)cobaloxime, EaPyCo refers to α-carboethoxyethyl(pyridinato)-cobaloxime, and tBaPyCo refers to 1-(tert-butoxycarbonyl)ethyl(pyridinato)-cobaloxime.

TABLE I

| Cobaloxime Compound | Cobaloxime (g) | Ethyl acrylate (g) | Chloroform (g) | Polymerization Time (Hr) | Conversion (%) | $M_n$ |
|---|---|---|---|---|---|---|
| IpPyCo | 0.095 | 9.82 | 2.94 | 11 | 35 | 20,800 |
| IpPyCo | 0.047 | 10.61 | 2.97 | 47.9 | 72 | 54,700 |
| IpPyCo | 0.024 | 9.66 | 2.99 | 25.6 | 57 | 76,800 |
| EaPyCo | 0.126 | 9.38 | 3.21 | 6.9 | 59 | 27,700 |
| EaPyCo | 0.062 | 9.79 | 3.23 | 25.4 | 85 | 46,800 |
| EaPyCo | 0.015 | 4.77 | 0.99 | 48.5 | 77 | 115,632 |
| tBaPyCo | 0.113 | 10.00 | 3.63 | 7.5 | 59 | 28,100 |
| tBaPyCo | 0.056 | 9.73 | 3.43 | 25.7 | 80 | 53,100 |

EXAMPLE 4

Following the general procedure set forth in the preceding example, t-butyl acrylate (4.47 g) was heated with 1-(tert-butoxycarbonyl)ethyl(pyridinato)cobaloxime (0.02 g) and chloroform (2.13 g) at 70° C. The results set forth in Table II were obtained by using the procedure set forth in the preceding example.

TABLE II

| Polymerization Time (Hr) | Conversion (%) | $M_n$ | $M_w/M_n$ |
| --- | --- | --- | --- |
| 0.9 | 27 | 17,600 | 1.8 |
| 2.0 | 62 | 23,500 | 1.7 |
| 4.4 | 79 | 20,500 | 2.0 |
| 6.2 | 91 | 19,600 | 1.7 |
| 19.0 | 100 | 16,200 | 2.0 |

EXAMPLE 5

Following the general procedure set forth in the preceding example, benzyl acrylate (5.3 g) was heated with α-carboethoxyethyl(pyridinato)-cobaloxime (0.04 g) and chloroform (1.79 g) at 70° C. The results set forth in Table III were obtained by using the procedure set forth in the preceding example.

TABLE III

| Polymerization Time (Hr) | Conversion (%) | $M_n$ | $M_w/M_n$ |
| --- | --- | --- | --- |
| 1.1 | 35 | 20,900 | 2.8 |
| 5.1 | 46 | 18,000 | 2.1 |
| 37.0 | 66 | 22,400 | 1.8 |
| 59.7 | 73 | 17,000 | 2.0 |

EXAMPLE 6

Following the general procedure set forth in the preceding example, ethyl acrylate (4.76 g) was heated with α-carboethoxyethyl(pyridinato)-cobaloxime (3.45 g) and bromoform (3.45 g) at 70° C. The results set forth in Table IV were obtained by using the procedure set forth in the preceding example.

TABLE IV

| Polymerization Time (Min) | Conversion (%) |
| --- | --- |
| 7 | 36 |
| 15 | 58 |
| 30 | 66 |
| 61 | 78 |
| 123 | 90 |

EXAMPLE 7

Following the general procedure set forth in the preceding example, ethyl acrylate (9.69 g) was heated with α-carboethoxyethyl(pyridinato)-cobaloxime (0.126 g) and 1,1,1-trichloroethane (3.16 g) at 70° C. The results set forth in Table V were obtained by using the procedure set forth in the preceding example.

TABLE V

| Polymerization Time (Hr) | Conversion (%) | $M_n$ | $M_w/M_n$ |
| --- | --- | --- | --- |
| 0.6 | 19.5 | 37,200 | 2.9 |
| 1.0 | 20.3 | 44,900 | 2.0 |
| 2.0 | 35.1 | 51,500 | 2.9 |
| 4.0 | 70.4 | 45,900 | 1.9 |
| 7.0 | 80.2 | 48,900 | 1.9 |

EXAMPLE 8

Following the general procedure set forth in the preceding example, methyl methacrylate (5.02 g) was heated with α-carboethoxyethyl(pyridinato)-cobaloxime (0.03 g) and carbon tetrachloride (1.68 g) at 70° C. The results set forth in Table VI were obtained by using the procedure set forth in the preceding example.

TABLE VI

| Polymerization Time (Hr) | Conversion (%) | $M_n$ | $M_w/M_n$ |
| --- | --- | --- | --- |
| 5 | 89 | 34,300 | 2.2 |
| 10 | 85 | 34,500 | 2.5 |
| 32 | 98 | 34,700 | 2.1 |

EXAMPLE 9

A mixture of methyl methacrylate (4.93 g), α-carboethoxyethyl(pyridinato)-cobaloxime (0.03 g) and methyl trichloroacetate (1.59 g) was heated for five minutes at 70° C. Poly(methyl methacrylate) was obtained (93% yield), and was characterized as having a $M_n$ of 99,900 and a molecular weight ($M_w/M_n$) distribution ratio of 3.58. Polymerization occurred quickly, and therefore it was concluded that there was little opportunity for catalytic chain transfer reactions to occur which gave rise to the high molecular weight products that were formed.

EXAMPLE 10

A mixture of styrene (4.79 g), α-carboethoxyethyl (pyridinato)-cobaloxime (0.03 g) and carbon tetrachloride (1.68 g) was heated at 70° C. for 21 hours. Polystyrene having a molecular weight ($M_n$) of 3,040 and a molecular weight distribution ($M_w/M_n$) of 2.5 was obtained in 38 percent yield.

EXAMPLE 11

Following the general procedure set forth in Example 9, styrene (4.79 g) was heated with α-carboethoxyethyl (pyridinato)-cobaloxime (0.03 g) and methyl trichloroacetate (1.60 g) at 70° C. The results set forth in Table VII were obtained by using the procedure set forth in Example 9.

TABLE VII

| Polymerization Time (Hr) | Conversion (%) | $M_n$ | $M_w/M_n$ |
| --- | --- | --- | --- |
| 14 | 34 | 970 | 12.8 |
| 58 | 38 | — | — |

TABLE VII-continued

| Polymerization Time (Hr) | Conversion (%) | $M_n$ | $M_w/M_n$ |
|---|---|---|---|
| 186 | 48 | 1,160 | 7.4 |
| 1250 | 66 | 2,060 | 2.8 |

These results show that catalytic chain transfer takes place in this polymerization system.

EXAMPLE 12

A copolymer of styrene and chloromethylstyrene was prepared. Specifically, a mixture of styrene (8 ml), chloromethylstyrene (2 ml), azobisisobutylonitrile (0.082 g) and benzene (10 ml) was purged with argon and heated at 70° C. for four hours. The mixture was then poured into a large volume of methanol to precipitate the copolymer that was formed. It was collected by filtration and dried overnight at 45° C. and 1 mm Hg. The yield was 2.8 g (30%). Gel permeation chromatography indicated that the product had a molecular weight ($M_n$) of 24,800 and a molecular weight distribution ($M_w/M_n$) of 1.7. NMR analysis indicated that the product was styrene-chloromethylstyrene copolymer containing 20.4 mole percent chloromethylstyrene. The copolymer was used in grafting experiments described below.

EXAMPLE 13

The styrene-chloromethylstyrene copolymers prepared above were grafted by using cobaloxime. Specifically, a sample of copolymer (1.02 g) was mixed with methyl methacrylate (9.68 g), methyl ethyl ketone (1.81 g) and cobaloxime (0.05 g) and the mixture was heated for various times at 70° C. The reaction mixture was filtered and the filtrate was added to excess methanol to precipitate the product. Table VIII below gives the reaction times, the methyl methacrylate conversions, and the molecular weights of the various products from five different trials.

TABLE VIII

| Trial | Reaction Time (Hr) | Methyl Methacrylate Conversion (%) | $M_n$ | $M_w/M_n$ |
|---|---|---|---|---|
| 1 | 1.1 | 9 | 29,700 | 17.6 |
| 2 | 2.6 | 15 | 28,200 | 52.7 |
| 3 | 7.5 | 23 | — | — |
| 4 | 19.4 | 32 | 27,100 | 72.0 |
| 5 | 70.4 | 36 | — | — |

The product from Trial 3 was analyzed by NMR spectroscopy and it was determined that the product contained 4.1 poly(methyl methacrylate) grafts per original copolymer molecule and an average of 6.5 methyl methacrylate units per graft.

EXAMPLE 14

The poly(chloromethylstyrene-co-styrene) prepared Example 12 was grafted with methyl methacrylate as set forth in the previous example except that zinc was used in addition to the cobaloxime. Specifically, the copolymer (0.29 g), methyl methacrylate (0.93 g), methyl ethyl ketone (1.08 g), cobaloxime (0.018 g) and zinc powder (0.47 g) were admixed. The resultant grafted copolymer had a molecular weight ($M_n$) of 25,600 and a molecular weight distribution ($M_w/M_n$) of 50. NMR spectrum indicated that the product contained 10 grafts per original copolymer chain and an average of 6.9 methyl methacrylate units per graft. This result demonstrates that the presence of zinc increases the efficiency of the grafting reaction.

EXAMPLE 15

In a similar fashion to the preceding examples, poly (isobutyl-methacrylate) was grafted to poly (chloromethylstyrene-co-styrene) by using cobaloxime. Specifically, copolymer (0.30 g), isobutyl methacrylate (0.88 g), methyl ethyl ketone (1.06 g), and cobaloxime (0.017 g) were admixed. The reaction mixture was purged with argon and heated at 70° C. for two days. The product was purified by Soxhlet extraction with methanol overnight. The product was determined to have a molecular weight ($M_n$) of 18,300 and a molecular weight distribution ($M_w/M_n$) ratio of 7.9. NMR analysis indicated that the product had 4.6 poly(isobutyl methacrylate) grafts per original copolymer chain with an average of 4.8 monomer units per graft.

EXAMPLE 16

In a similar fashion to the preceding examples, poly(ethyl acrylate) was grafted to poly(chloromethylstyrene-co-styrene) by using cobaloxime. Specifically, the styrene-chloromethylstyrene copolymer (1.02 g), ethyl acrylate (10.1 g), methyl ethyl ketone (1.1 g), and cobaloxime (0.05 g) were admixed. The mixture was purged with argon and heated at 70° C. for 7.8 hours. A second sample was heated for 70.8 hours. Products isolated from these reactions were soluble in tetrahydrofuran, which indicated that they were not crosslinked. The sample that was heated for 7.8 hours was determined to have an ethyl acrylate conversion of 11 percent, a molecular weight ($M_n$) of 34,100, and a molecular weight distribution ($M_w/M_n$) of 30.5. The sample that was heated for 70.8 hours was determined to have an ethyl acrylate conversion of 34 percent, a molecular weight ($M_n$) of 33,400, and a molecular weight distribution ($M_w/M_n$) of 40.5.

NMR spectrum of the products indicated that the products contained an average of 3.1 grafts per original copolymer molecule.

What is claimed is:

1. A polymerization process comprising the steps of:
   admixing a halogen-containing compound, monomer, a cobalt complex, and reducing agent.

2. A polymerization process comprising the steps of:
   admixing a halogen-containing compound, monomer, and a cobalt complex selected from the group consisting of cobaloxime, organocobaloxime, cobalt porphyrin, and mixtures thereof, wherein the halogen-containing compound is a polymer containing at least one carbon-halogen bond having the halogen atom bound pendant to the polymer backbone, bound to an organic group that is pendent to the polymer backbone, or bound at the polymer chain end, and the cobalt complex reacts with the at least one carbon-halogen bond to form a radical capable of participating in a catalytic chain transfer or pseudo-living polymerization process.

3. A process for forming a methacrylate-functionalized polymer comprising the steps of:

admixing a halogen-containing polymer containing at least one carbon-halogen bond having the halogen atom bound pendent to the polymer backbone, bound to an organic group that is pendent to the polymer backbone, or bound at the polymer chain end, a cobalt complex selected from the group consisting of cobaloxime, organocobaloxime, cobalt porphyrin, and mixtures thereof, and a methacrylate ester, and heating the admixture, wherein the halogen-containing compound is a polymer containing at least one carbon-halogen bond having the halogen atom bound pendent to the polymer backbone, at the polymer chain end, or both, and the cobalt complex reacts with the at least one carbon-halogen bond to form a radical capable of participating in a catalytic chain transfer process with the methacrylate ester.

4. A process for forming polyacrylate-functionalized polymer comprising the steps of:

admixing a halogen-containing polymer containing at least one carbon-halogen bond having the halogen atom bound pendent to the polymer backbone, bound to an organic group pendent to the polymer backbone, or bound at the polymer chain end, a cobalt complex selected from the group consisting of cobaloxime, organocobaloxime, cobalt porphyrin, and mixtures thereof, and acrylate monomer, and heating the admixture, wherein the cobalt complex reacts with the at least one carbon-halogen bond to form a radical capable of participating in a pseudo-living polymerization process with the acrylate monomer.

5. The process of claim 1, wherein said step of admixing is conducted in hexane, benzene, toluene, acetone, methyl-ethyl ketone, tetrahydrofuran, methylcellusolve, dioxane, decalin, or mixtures thereof.

6. The process of claim 1, wherein the halogen-containing compound is a polymer containing at least one carbon-halogen bond, where the halogen atom is bound pendent to the polymer backbone, bound to an organic group that is pendent to the polymer backbone, or bound at the polymer chain end.

7. The process of claim 2, where the carbon in the at least one carbon-halogen bond is attached to a stabilizing group selected from phenyl groups, carbonyl groups, nitrile groups, vinyl groups, and substituted vinyl groups.

8. The process of claim 2, where said halogen-containing compound is selected from styrene-butadiene copolymers containing chloromethylstyrene units, brominated isobutylene-isoprene copolymers, and unsaturated polyesters containing reactive halogen atoms.

9. The process of claim 1, where said halogen-containing compound is selected from CCl$_4$, CBr4, CBrCl$_3$, ΦCH$_2$Br, ΦCH$_2$Cl, CCl$_3$CH$_3$, ΦCHCl$_2$, CCl$_3$COCCl$_3$, and CCl$_3$COOR, wherein R is an alkyl group, substituted alkyl group, aryl group, and substituted aryl group.

10. The process of claim 1, where the monomer is a methacrylate monomer, vinyl aromatic monomer, methacrylamide, or mixture thereof.

11. The process of claim 10, wherein the methacrylate monomer is selected from methyl methacrylate, ethyl methacrylate, propyl methacrylate, t-butyl methacrylate, phenyl methacrylate, hydroxyethyl methacrylate, and N,N-dimethymethacrylamide.

12. The process of claim 11, where the admixture contains from about 10 to about 5000 parts by weight methacrylate monomer per one hundred parts by weight halogen-containing compound.

13. The process of claim 1, further comprising the step of heating the admixture.

14. The process of claim 13, where the admixture is heated to a temperature of about 70° C.

15. The process of claim 2, where said admixture further comprises a reducing agent.

16. The process of claim 15, wherein said reducing agent is selected from zinc, iron, copper, and hydrogen.

17. The process of claim 16, where said reducing agent is zinc.

18. The process of claim 1, wherein said reducing agent is selected from zinc, iron, copper, and hydrogen.

19. The process of claim 3, wherein the methacrylate monomer is:

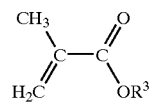

wherein R includes an organic group.

20. The process of claim 4, wherein the acrylate monomer is:

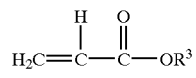

wherein R$^3$ includes an organic group.

21. The process of claim 4, where said step of admixing is conducted at a temperature from about 70° C. to about 150° C.

* * * * *